United States Patent [19]

Munde

[11] Patent Number: 4,534,570

[45] Date of Patent: Aug. 13, 1985

[54] SEALING RING FOR A CENTRIFUGAL SEPARATOR

[75] Inventor: Jan Munde, Gnesta, Sweden

[73] Assignee: Alfa-Laval AB, Tumba, Sweden

[21] Appl. No.: 594,986

[22] Filed: Mar. 29, 1984

[30] Foreign Application Priority Data

Apr. 5, 1983 [SE] Sweden .............................. 8301850

[51] Int. Cl.³ .............................................. F16J 15/34
[52] U.S. Cl. ..................................... 277/95; 277/177
[58] Field of Search .................... 277/174, 173, 177

[56] References Cited

U.S. PATENT DOCUMENTS

| | | | |
|---|---|---|---|
| 2,360,731 | 10/1944 | Smith | 277/177 |
| 2,444,119 | 6/1948 | Thorn et al. | 277/177 |
| 2,674,279 | 7/1972 | McMurray et al. | 277/95 |
| 2,676,041 | 4/1954 | Englesson | 277/95 |
| 2,893,795 | 7/1959 | Dooling | 277/177 |
| 3,347,555 | 10/1967 | Norton | 277/177 |
| 3,366,392 | 1/1968 | Kennel | 277/177 |
| 4,304,415 | 12/1981 | Wolf et al. | 277/205 |
| 4,342,463 | 8/1982 | Burke | 277/177 |

*Primary Examiner*—Robert I. Smith
*Attorney, Agent, or Firm*—Cyrus S. Hapgood

[57] ABSTRACT

A sealing ring (5) which is intended to seal between two relative to each other axially movable parts (2, 7) of the rotor of a centrifugal separator, and which has edges bevelled such that it can be impressed in its sealing surface only when the recesses formed by the bevelling have been filled up by material from the sealing ring as a result of plastic deformation of the latter by compression between the rotor parts (2, 7).

4 Claims, 4 Drawing Figures

SEALING RING FOR A CENTRIFUGAL SEPARATOR

The present invention relates to a sealing ring intended to be placed in an axially open groove in a first rotor part of a centrifugal separator of the kind having a second rotor part, which is axially movable relative to the first rotor part and arranged to be brought into and out of abutment against said sealing ring placed in the groove via an annular projection, which is narrower than said groove in the first rotor part.

A sealing ring of this kind is subjected to heavy compression between the two rotor parts, which are axially movable relative to each other. As a result of this the sealing ring rather soon will be impressed, i.e. plastically deformed by the annular projection of the second rotor part.

After some time of operation, during which the rotor parts have been axially moved a number of times relative to each other into and out of sealing engagement via the sealing ring, the impression of the sealing ring has become so extensive that the sealing ring has to be replaced.

The object of the present invention is to provide an arrangement by means of which the problem of impression of sealing rings of the above described kind is reduced considerably.

This object is accomplished according to the invention by only a minor change of the design of the sealing ring, namely such that the edges of the sealing ring on each side of the surface, by which the sealing ring is intended to abut the projection of the second rotor part, are bevelled to such a degree that the annular surface of the projection, located nearest the sealing ring, has a radial extension which is at least as large as that of the sealing ring surface remaining between the bevels. The bevel is preferably such that the annular surface of the projection has a larger radial extension than the sealing ring surface remaining between the bevels.

By designing sealing rings in this way an essentially doubled life-time has been verified by tests for the sealing rings. In one case, for instance, it has been possible to prolonge the operational time of a centrifugal separator from 1000 to 2000 hours before replacement of the sealing ring has been necessary.

The invention is described more in detail below with reference to the accompanying drawing. Therein FIG. 1 shows a part of a centrifugal separator with a sealing ring of the type here in question.

Figure 1:
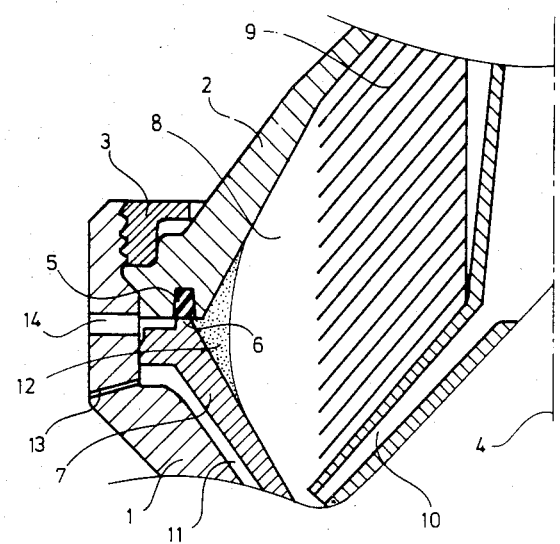

FIG. 1 shows a part of a centrifugal separator comprising a lower rotor part 1 and an upper rotor part 2, which are axially joined by a lock ring 3. The axis of the rotor is illustrated by a dash-dot line 4.

In an annular groove, open downwards, in the upper rotor part 2 there is placed a sealing ring 5. Abutting this sealing ring there is an annular projection 6 of a slide member 7, which is axially movable relative to the rotor parts 1 and 2.

Between the slide member 7 and the upper rotor part 2 there is formed a separation chamber 8, in which a set of conical separation plates 9 is arranged. The separation chamber 8 and an inlet 10 for a mixture of liquid and sludge which are to be separated. Between the slide member 7 and the lower rotor part 1 there is a chamber, which during operation of the rotor is charged and kept filled with liquid, usually water. By the rotation of the rotor a liquid pressure is created in the chamber 11, which forces the slide member 7 into sealing contact with the sealing ring 5 against the action of the pressure from the mixture of sludge and liquid present in the separation chamber 8. The reference number 12 is designating sludge separated in the separation chamber 8.

Liquid freed from sludge leaves the separation chamber 8 through an outlet (not shown) radially inside the set of plates 9. When desired, the supply of liquid to the chamber 11 is temporarily cut off, the chamber being drained via a number of throttled peripheral outlets 13. The slide member 7, thereby, will be pressed downwards by the pressure of the contents of the separation chamber 8, and the separated sludge will be thrown out through a number of peripheral outlets 14. Depending on the length of the time period, during which the supply of liquid to the chamber 11 is cut off, more or less of the contents of the separation chamber 8 will be thrown out through the outlets 14.

In FIG. 2 at a there is shown a sealing ring 5 designed in a conventional manner, as it looks like in a newly manufactured condition. After some time of operation of a centrifuge rotor according to FIG. 1 a sealing ring of this kind has assumed a shape as that illustrated at b. This is because it has been impressed, i.e. plastically deformed, by the projection 6 of the slide member 7, lips 15 having been formed in it. If such an impression is allowed to continue too far, the sealing ability of the sealing ring may get lost by a piece of a lip 15 being bent inwards and being squeezed between the sealing surfaces of the ring 5 and the projection 6, respectively, in connection with sludge discharge through the outlets 14. There is also a risk that an unsufficient gap would come up between the sealing ring 5 and the projection 6 for separated sludge to leave the separation chamber 8.

Figure 3:
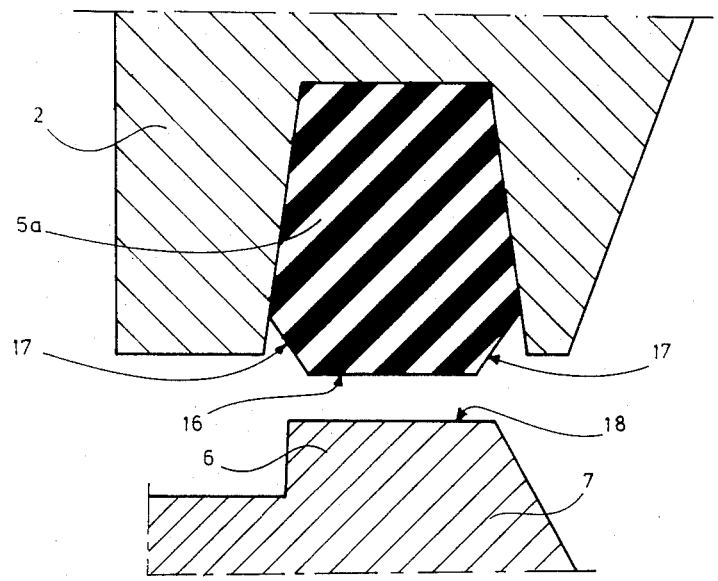
FIG. 3 shows a sealing ring designed according to the invention.

To avoid this and to prolong the life-time of the sealing ring a sealing ring can be designed as shown in FIG. 3. Here a sealing ring 5a is shown, which is designed according to the present invention and placed in the above mentioned groove in the rotor part 2. The size of the flat surface 16 of the sealing ring facing away from the groove has, in this embodiment, been reduced by bevelling of the sealing ring edges at 17. The bevels are such that the flat surface 16 has got somewhat smaller radial extension than the flat surface 18 of the projection 6 facing the sealing ring. As shown, the surface 16 of the sealing ring is located at a level somewhat axially outside the groove in the rotor part 2, so that a sufficient gap can be created for unobstructed passage of sludge between the rotor part 2 and the projection 6 even after a certain plastic deformation of the sealing ring has occurred.

Figure 2A:
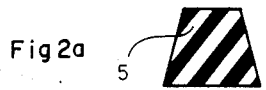
FIG. 2 (A and B) shows a sealing ring designed in a conventional manner, before and after impression.
Figure 2B:

After some time of operation a sealing ring, designed according to FIG. 3, has assumed substantially the same form as a sealing ring designed in a conventional manner according to FIG. 2a. After some further time the sealing ring 5a will show the same form as illustrated in FIG. 2b. The total time of operation, during which a sealing ring 5a according to the invention can be used, is approximately twice as long as the corresponding time of operation for a sealing ring designed in a conventional manner.

In the following claims the present invention has been defined to mean bevelling of the sealing ring edges on each side of the surface 16, with which the sealing ring is intended to abut the projection 6. By the expression bevelling in this connection it shall be understood any recessing action giving as a result that in the first place the recess is filled up with material from the sealing ring, when the sealing ring is plastically deformed by compression between the rotor parts 2 and 7 during the operation of the centrifugal separator.

I claim:

1. A centrifugal separator comprising a rotor mounted for rotation about an axis, the rotor having a first part provided with an annular groove surrounding said axis, the rotor also having a second part provided with an annular projection surrounding said axis and toward which said groove opens through an annular opening of the groove, said projection having opposite the annular groove an annular abutment surface which is of smaller radial dimension and therefore narrower than said annular opening of the groove, said second rotor part being movable axially toward and away from said first rotor part, and a sealing ring of plastically deformable material located in the groove and having an annular sealing surface engageable by said annular abutment surface upon movement of said second rotor part toward said first rotor part, a portion of said ring closest to said abutment surface having annular bevelled edges at opposite sides of said annular sealing surface, whereby the ring has a cross-section which, at said closest portion, tapers toward said projection, said annular abutment surface having a radial dimension which is at least as large as the radial dimension of said annular sealing surface, whereby said annular abutment surface is at least as wide as said annular sealing surface.

2. The centrifugal separator of claim 1, in which said annular abutment surface has a larger radial dimension than said annular sealing surface.

3. The centrifugal separator of claim 1, in which said bevelled edges coact with opposing walls of the groove to form annular recesses, said annular abutment surface being operable to force parts of the ring into said recesses.

4. The centrifugal separator of claim 3, in which said annular sealing surface of the ring lies outside the groove.

* * * * *